United States Patent [19]
Scharpenberg

[11] Patent Number: 4,816,207
[45] Date of Patent: Mar. 28, 1989

[54] METHOD FOR CHECKING THE DIMENSIONS OF A FUEL ASSEMBLY FOR NUCLEAR REACTORS

[75] Inventor: Rainer Scharpenberg, Wald-Michelbach, Fed. Rep. of Germany

[73] Assignee: Brown, Boveri Reaktor GmbH, Mannheim, Fed. Rep. of Germany

[21] Appl. No.: 936,221

[22] Filed: Dec. 1, 1986

[30] Foreign Application Priority Data

Nov. 29, 1985 [DE] Fed. Rep. of Germany ....... 3542200

[51] Int. Cl.⁴ .................... G21C 17/06; G01B 17/00
[52] U.S. Cl. ...................................... 376/252; 73/622
[58] Field of Search ................ 376/245, 252, 258; 73/622, 625, 628, 641

[56] References Cited

U.S. PATENT DOCUMENTS

| | | | |
|---|---|---|---|
| 4,464,332 | 8/1984 | Boisseuil et al. | 376/245 |
| 4,517,152 | 5/1985 | Pieper et al. | 376/252 |
| 4,645,634 | 2/1987 | Roseveare | 376/245 |
| 4,655,993 | 4/1987 | Scharpenberg | 376/245 |
| 4,683,104 | 7/1987 | Scharpenberg | 376/245 |

FOREIGN PATENT DOCUMENTS

| | | | |
|---|---|---|---|
| 0051016 | 5/1982 | European Pat. Off. | 376/252 |
| 0063681 | 11/1982 | European Pat. Off. | 376/252 |
| 0081747 | 6/1983 | European Pat. Off. | 376/252 |
| 0169014 | 10/1983 | Japan | 73/622 |

*Primary Examiner*—Deborah L. Kyle
*Assistant Examiner*—Richard W. Wendtland
*Attorney, Agent, or Firm*—Herbert L. Lerner; Laurence A. Greenberg

[57] ABSTRACT

A method for checking the dimensions of a fuel assembly for nuclear reactors formed of a bundle of longitudinally extended fuel rods disposed in rows in a water tank defining gaps between the rows includes moving two mutually parallel probes with respective ultrasonic test heads at free ends thereof relative to the fuel assembly, inserting the probes laterally into the gaps between the fuel rods accommodating a row of fuel rods between the probes, transmitting ultrasonic waves with one of the ultrasonic test heads, receiving the ultrasonic waves with the other ultrasonic test head, continuing irradiation during the movement of the probe, determining at least one of the height and width of a peak of the ultrasonic waves associated with a water path between the transmitting and receiving test heads, and using at least one of the height and width of the peak to determine the spacing between two fuel rods.

3 Claims, 3 Drawing Sheets

METHOD FOR CHECKING THE DIMENSIONS OF A FUEL ASSEMBLY FOR NUCLEAR REACTORS

The invention relates to a method for checking the dimensions of a fuel assembly for nuclear reactors formed of a bundle of longitudinally extended fuel rods disposed in rows in a water tank defining gaps between the rows, by moving two mutually parallel probes each carrying an ultrasonic test head at the free end thereof relatively to the fuel assembly, transmitting ultrasonic waves with one ultrasonic test head and receiving the transmitted ultrasonic waves with the other ultrasonic test head.

Such a method is known from Published European Patent Application No. 0 080 418. In that method an ultrasonic test head functioning as an emitter and receiver on opposite sides of the fuel assembly is passed along the outer fuel rod row of a fuel assembly and irradiates the fuel rods ultrasonically. The echo returning from the fuel rods of the outer row is referred to the coordinates of the measuring device and as a result the position of each fuel rod is determined with respect to the X and Y axes of the coordinate field. With this method it is only possible to measure the outer fuel rods of a fuel rod cluster. In addition, incorrect measurements cannot be ruled out in the direct ultrasonic irradiation of the fuel rods since, for example, rods provided with a covering may falsify the echo return. In order to correct the propagation velocity in water as a function of the temperature of the water, one of the test heads disposed on opposite sides is used as a transmitter and the other as a receiver.

It is accordingly an object of the invention to provide a method for checking the dimensions of a fuel assembly for nuclear reactors, which overcomes the hereinaforementioned disadvantages of the heretofore-known devices of this general type and with which it is possible to evaluate all of the rod positions without the necessity of an echo evaluation.

With the foregoing and other objects in view there is provided, in accordance with the invention, a method for checking the dimensions of a fuel assembly for nuclear reactors formed of a bundle of longitudinally extended fuel rods disposed in rows in a water tank defining gaps between the rows, which comprises moving two mutually parallel probes with respective ultrasonic test heads at free ends thereof relative to the fuel assembly, inserting the probes laterally into the gaps between the fuel rods accommodating a row of fuel rods between the probes, transmitting ultrasonic waves with one of the ultrasonic test heads, receiving the ultrasonic waves with the other ultrasonic test head, continuing irradiation during the movement of the probe, determining at least one of the height and/or width of an amplitude or peak of the ultrasonic waves associated with a water path between the transmitting and receiving test heads, and using at least one of the height and/or width of the peak to determine the spacing between two fuel rods.

As a result of these measures it is possible to draw a reliable conclusion about the change in the gap between two fuel rods merely by evaluating the accoustic pressure change and/or the transit time variation between transmitting and receiving test heads. Continuous ultrasonic irradiation makes it possible to determine the position of the probe unambiguously since the signals which traverse a fuel rod have a different characteristic from those which only traverse the water path between transmitting and receiving test heads.

In accordance with another mode of the invention, there is provided a method which comprises associating a required peak with a required spacing between two fuel rods, and comparing the actual peak with the required peak.

The actual dimensions can consequently be determined to an accuracy of one-tenth of a millimeter using a suitable calibration.

In accordance with a concomitant mode of the invention, there is provided a method method for checking the dimensions of a fuel assembly for nuclear reactors formed of a bundle of longitudinally extended fuel rods disposed in rows in a water tank defining gaps between the rows, which comprises moving two mutually parallel probes with respective ultrasonic test heads at free ends thereof relative to the fuel assembly, inserting the probes laterally into the gaps between the fuel rods accommodating at least one fuel rod of a row of fuel rods between the probes, transmitting ultrasonic waves with one of the ultrasonic test heads, receiving the ultrasonic waves with the other ultrasonic test head, continuing irradiation during the movement of the probes, determining and recording the position of a first water signal attenuation, determining and recording the position of the water signal attenuation at various levels on the same fuel rod, as viewed in axial direction of the fuel rod, and reproducing the axial profile of a fuel rod by connecting a line between the determined and recorded positions.

The change in the water-path peak in this case is an indication that the free accoustic path in the water path is disturbed by a fuel rod. The positions of the peak change of a fuel rod, when viewed at several levels in the axial direction of the rod, produces a picture of the extension of the fuel rod relative to an imaginary zero line. Deviations of the rod extension from the zero line indicate a bowing.

Other features which are considered as characteristic for the invention are set forth in the appended claims.

Although the invention is illustrated and described herein as embodied in a method for checking the dimensions of a fuel assembly for nuclear reactors, it is nevertheless not intended to be limited to the details shown, since various modifications may be made therein without departing from the spirit of the invention and within the scope and range of equivalents of the claims.

The method of operation of the invention, however, together with additional objects and advantages thereof will be best understood from the following description of specific embodiments when read in connection with the accompanying drawings.

Figure 1:
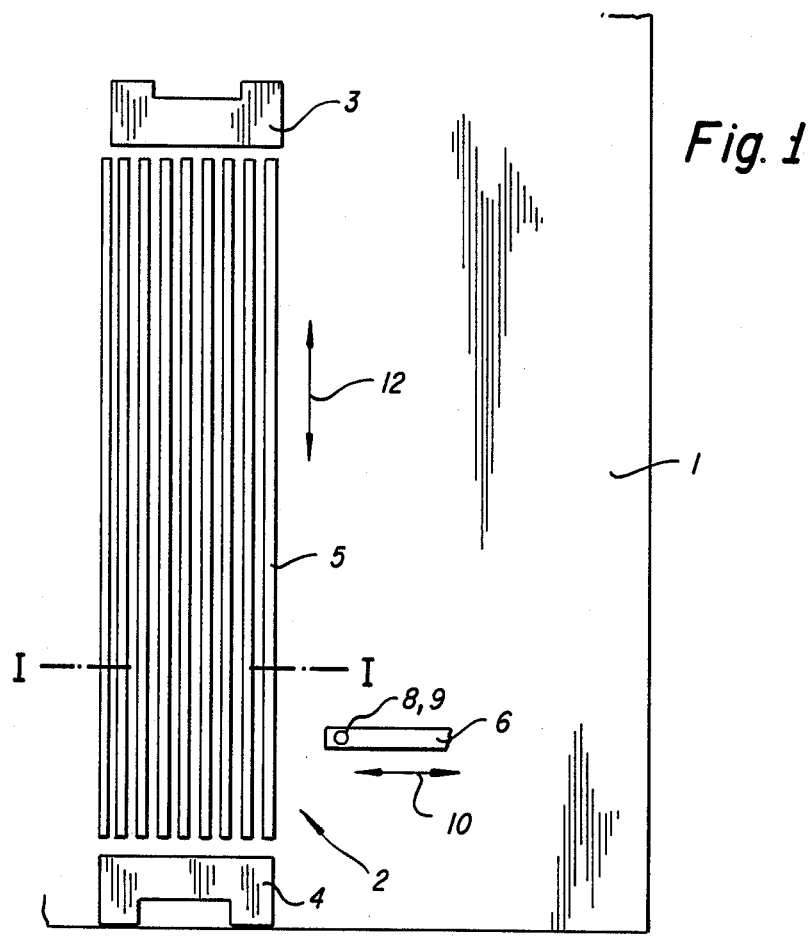
FIG. 1 is a front-elevational view of a fuel assembly disposed in a water tank.
Figure 1A:
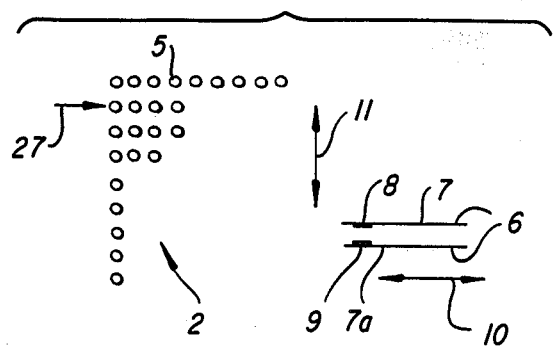
FIG. 1a is a cross-sectional view along the line I—I in FIG. 1.

Referring now to the figures of the drawings in detail and first, particularly, to FIGS. 1 and 1a thereof, it is seen that reference numeral 1 designates a part of a water tank in which a fuel assembly 2 is disposed. The fuel assembly is formed of an upper and a lower end piece 3, 4 between which there extends a multiplicity of fuel rods 5. As can be seen from the cross-section of the fuel assembly shown in FIG. 2, the fuel rods 5 are disposed in rows 27 and at a certain spacing from each other due to non-illustrated holding elements. An ultrasonic probe 6 is equipped with two fingers 7, 7a which carry ultrasonic test heads 8, 9 directed toward each other, at the free ends thereof. One of the test heads is used for transmitting and the other for receiving accoustic waves. The thickness, length and mutual spacing of the fingers are selected in such a way that upon insertion of the probe 6 in direction of an arrow 10, one fuel rod 5 or one row of fuel rods is always disposed between the fingers 7, 7a. The probe 6 can be moved by means of a non-illustrated probe carrier in the directions of arrows 11 and 12 as well as in the direction of the arrow 10, in order to also permit it to be inserted into other rows of fuel rods and at various levels, as viewed in the axial direction.

Figure 2A:
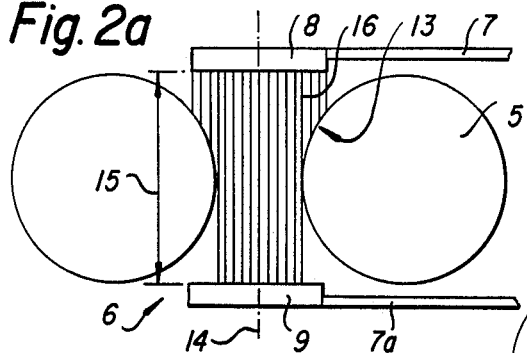
FIGS. 2a, 2c and 2e are enlarged cross-sectional views showing various measurement stages in the determination of the distance between two fuel rods.
Figure 2C:
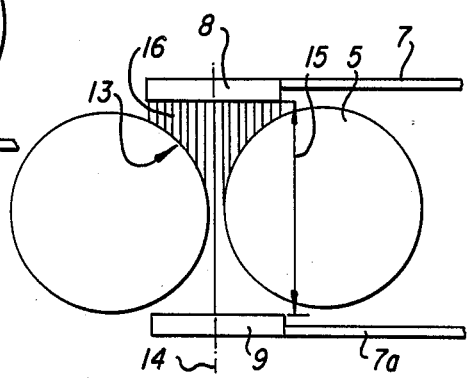
Figure 2B:
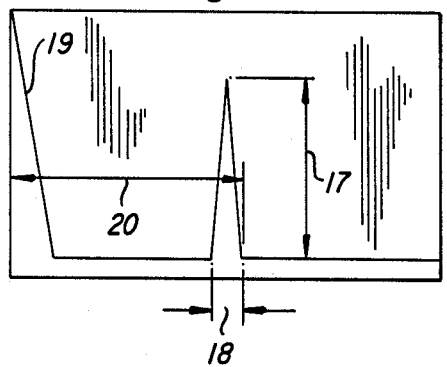
FIGS. 2b, 2d and 2f are views of displays on screens corresponding to FIGS. 2a, 2c and 2e, respectively.
Figure 2D:
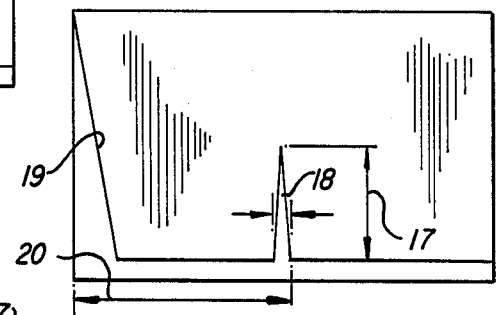
Figure 2E:
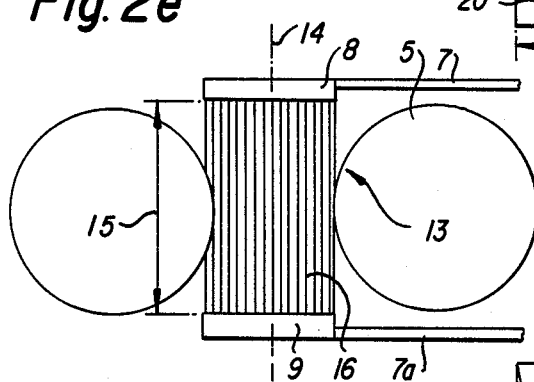

The checking of the distances between the individual fuel rods is explained by reference to FIGS. 2a to 2f. FIGS. 2a, 2c and 2e each show two fuel rods 5 of FIG. 1a, on a larger scale. According to FIG. 2a the fuel rods are disposed at a required spacing from each other, but the fuel rods according to FIG. 2c have a smaller spacing as compared with the required spacing and the fuel rods according to FIG. 2e have a larger spacing. Such a change in spacing is as a rule attributable to fuel rod bowing, which may occasionally occur during the insertion of the fuel assembly in the nuclear reactor.

Figure 2F:
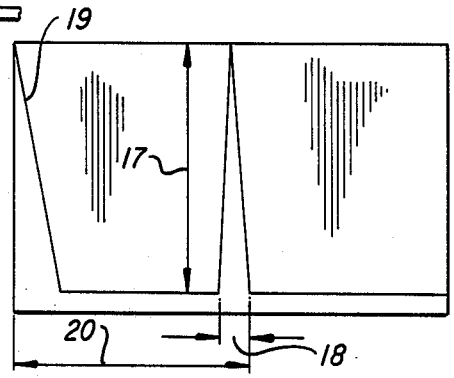

In order to check the spacing dimension, the fingers 7, 7a of the probe 6 are inserted into the lanes between the fuel rods 5. At the same time ultrasonic waves 13 are continuously emitted from the transmitting test head 8 and picked up by the receiving test head 9. The position of the test heads can be determined by the continuous ultrasonic irradiation in conjunction with an oscillograph, since the peak or amplitude has a different characteristic when traversing the fuel rods than when traversing a water path. As soon as the axes of symmetry 14 of the test heads 8, 9 of the probe 6 have reached the center position of the actual spacing between two fuel rods, the height and/or the width of the peak which is formed when a water path 15 is traversed at this position by the accoustic waves, is used to determine the spacing dimension between two fuel rods. Lines 16 in FIGS. 2a, 2c and 2e represent a sonic beam originating from the transmitting test head 8, which is more or less attenuated in its peripheral regions depending on the gap width (spacing dimension between two fuel rods) and which reaches the receiving test head 9 with reduced intensity. This manifests itself in a different peak height 17 or peak width 18, as is evident in FIGS. 2b, 2d and 2f. FIG. 2b is associated with FIG. 2a, FIG. 2d with FIG. 2c and FIG. 2f with FIG. 2e. FIGS. 2b, 2d and 2f represent display screen sections of an oscillograph. A transmitted pulse 19 reaches the receiving test head 9 after a transmit time represented by reference numeral 20. The peak height 17 and the peak width 18 have a certain relationship to the spacing dimension between two fuel rods. A larger peak height 17 or peak width 18 is associated with a large spacing dimension between two fuel rods 5 rather than with a small spacing dimension. In this connection, the width dimension of the test heads 8, 9 should be chosen in such a way that the accoustic beam is wider than the largest gap width (spacing dimension) to be expected. With appropriate calibration of the display screen or other registering device, the actual spacing dimension can be read off with an accuracy of one-tenth of a millimeter.

If FIG. 2a illustrates the required or nominal spacing between two fuel rods, then the peak according to FIG. 2b is the associated required or nominal peak. A comparison of the peaks determined in each case for the water path between the transmitting test head and the receiving test head (e.g. FIGS. 2d and 2f) with the required peak makes it possible to determine the deviation in one direction or the other in a simple manner.

Figure 3:
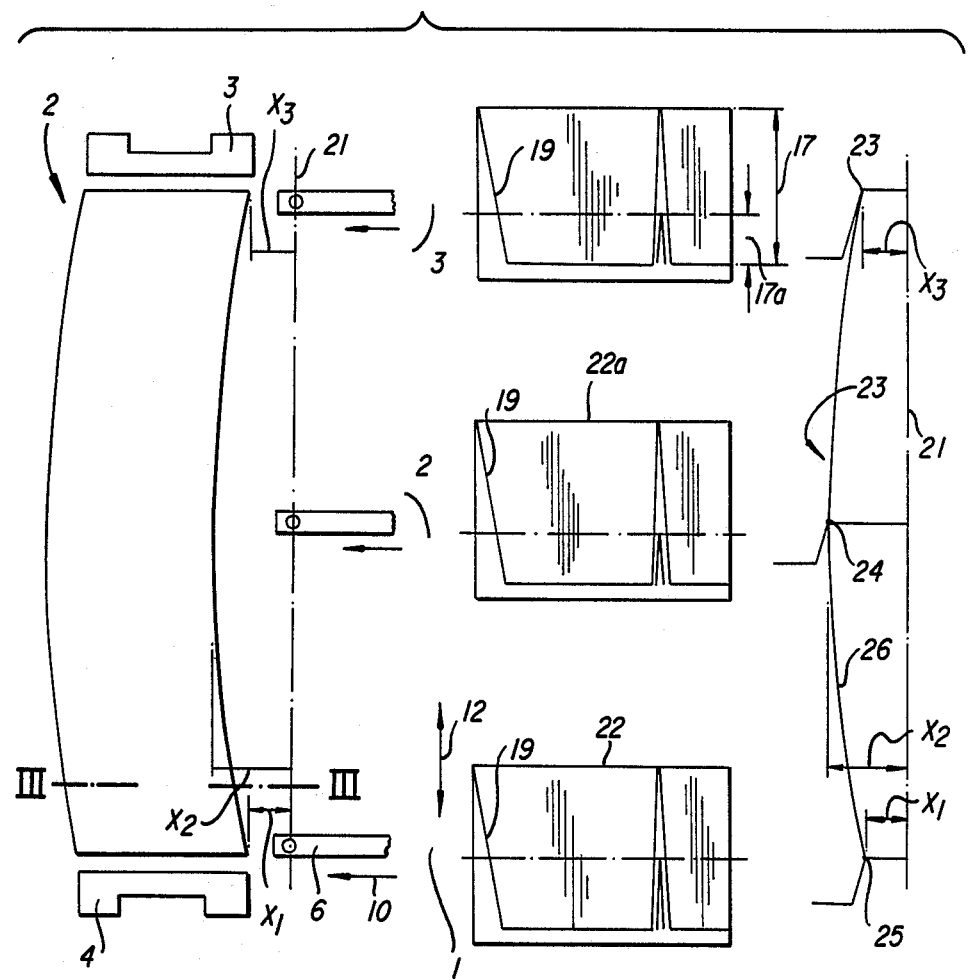
FIG. 3 is a front-elevational view of a fuel assembly, three views of displays on oscillographs and a plot on a plotter showing the determination of amounts of fuel rod bowing.
Figure 3A:
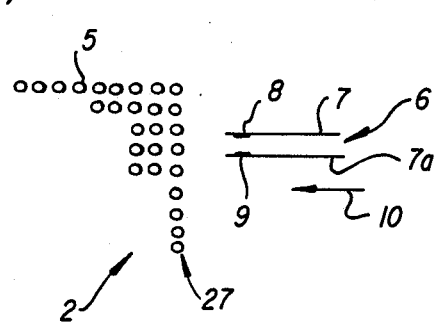
FIG. 3a is a cross-sectional view of a fuel assembly taken along the line III—III in FIG. 3.

The degree of bowing of a fuel rod over its longitudinal extent can be determined by a method to be explained by reference to FIGS. 3 and 3a. FIG. 3 shows a fuel assembly 2 in which all the fuel rods 5 have the same bowing, which may be due to incorrect transportation of the fuel assembly, for example. In order to determine the bowing in such a case, it is sufficient if the fuel rods in an outer row of fuel rods is checked. According to FIGS. 3 and 3a, the ultrasonic probe 6 described in more detail with reference to FIG. 1 is moved from a randomly chosen base line 21 in direction of the arrow 10, so that the fingers 7, 7a of the probe are able to accommodate a fuel rod 5 between them. While the probe moves in the direction of the arrow 10, transmitted pulses 19 pass continuously from the transmitting test head 8 to the receiving test head 9. Therefore, a peak height 17 corresponding to the water path between the test heads 8, 9 is displayed on a display screen 22 until the water signal is disturbed by a fuel rod and then it adjusts itself to a smaller peak height 17a. The path which the probe 6 traverses from the base line 21 up to the first change in the water-path signal is denoted X1 and is documented in a recorder plot 23 shown at the right-hand edge of FIG. 3. The probe 6, which has carried out this first measurement from a position 1 at the lower end of the fuel rods is then moved in the direction of the arrow 12 to a position 2. With continuous accoustic emission from the transmitting test head 8 to the receiving test head 9, the probe 6 is moved again from the base line 21 in the direction of the arrow 10 until the water-path signal undergoes disturbance caused by the fuel rod. The change in peak height produced by this is evident from a display screen 22a associated with the position 2. The path traversed from the base line 21 up to the change in the water-path signal is denoted X2 and is also documented in the recorder printout. After the probe has been moved in the direction of the arrow 12 to a position 3 associated with the upper fuel rod end, the measurement is made by the same method as described for positions 1 and 2. The path traversed from the base line 21 up to the change in the water-path signal is denoted as X3 and correspondingly documented in the recorder printout. If the plot is to scale, connecting the path points 23, 24 and 25 by means of a line 26 shows the profile of the bowing of the rod.

In addition to the outer fuel rods of a row, the remaining fuel rods of the fuel assembly can be measured by the above-described method. For this purpose, each other fuel rod is also approached from the base line 21. In this case the fuel rods lying between the fuel rod to be measured and the base line 21 are left out of consideration. The definitive factor is the water path traversed accoustically before reaching the fuel rod to be checked. The recorder plot then only documents the path of travel which the probe 6 traverses from the base line 21 up to the change in the water-path signal associated with the fuel rod to be tested.

The foregoing is a description corresponding in substance to German Application No. P 35 42 200.9-33, dated Nov. 29, 1985, the International priority of which is being claimed for the instant application, and which is hereby made part of this application. Any material discrepancies between the foregoing specification and the aforementioned corresponding German application are to be resolved in favor of the latter.

I claim:

1. Method for checking the dimensions of a fuel assembly for nuclear reactors formed of a bundle of longitudinally extended fuel rods disposed in rows in a water tank defining gaps between the rows, which comprises moving two mutually parallel probes with respective ultrasonic test heads at free ends thereof relative to the fuel assembly, inserting the probes laterally into the gaps between the fuel rods accommodating a row of fuel rods between the the probes, transmitting ultrasonic waves with one of the ultrasonic test heads, receiving the ultrasonic waves with the other ultrasonic test head, continuing irradiation during the movement of the probe, determining at least one of the height and width of a peak of the ultrasonic waves associated with a water path between the transmitting and receiving test heads, and using at least one of the height and width of the peak to determine the spacing between two fuel rods.

2. Method according to claim 1, which comprises associating a required peak with a required spacing between two fuel rods, and comparing the actual peak with the required peak.

3. Method for checking the dimensions of a fuel assembly for nuclear reactors formed of a bundle of longitudinally extended fuel rods disposed in rows in a water tank defining gaps between the rows, which comprises moving two mutually parallel probes with respective ultrasonic test heads at free ends thereof relative to the fuel assembly, inserting the probes laterally into the gaps between the fuel rods accommodating at least one fuel rod of a row of fuel rods between the probes, transmitting ultrasonic waves with one of the ultrasonic test heads, receiving the ultrasonic waves with the other ultrasonic test head, continuing irradiation during the movement of the probes, determining and recording the position of a first water signal attenuation, determining and recording the position of the water signal attenuation at various levels on the same fuel rod, as viewed in axial direction of the fuel rod, and reproducing the axial profile of a fuel rod by connecting a line between the determined and recorded positions.

* * * * *